Aug. 26, 1924.
H. A. TALLANT
PLUMB LEVEL
Filed Dec. 31, 1921
1,506,689
2 Sheets—Sheet 1
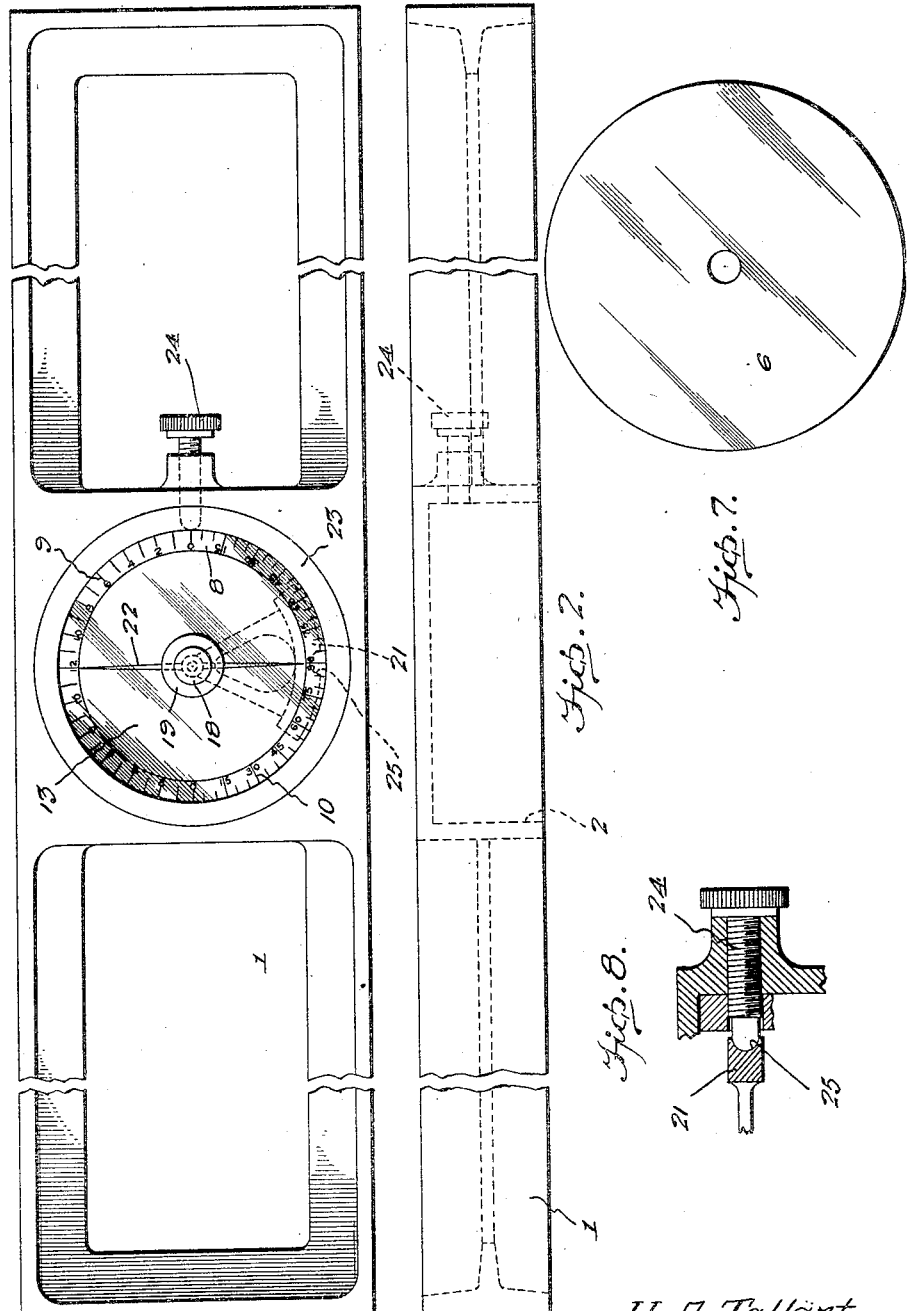
H. A. Tallant INVENTOR
BY Victor J. Evans ATTORNEY
WITNESS:

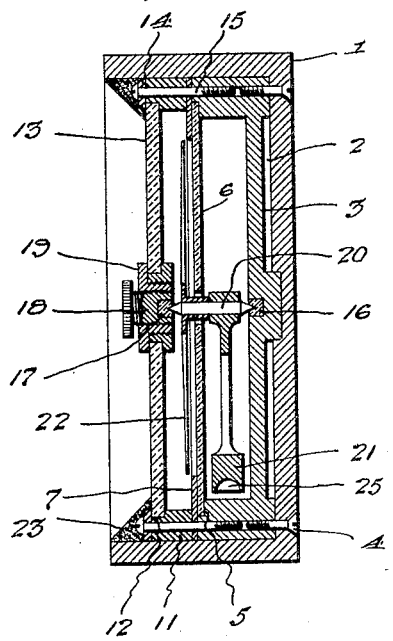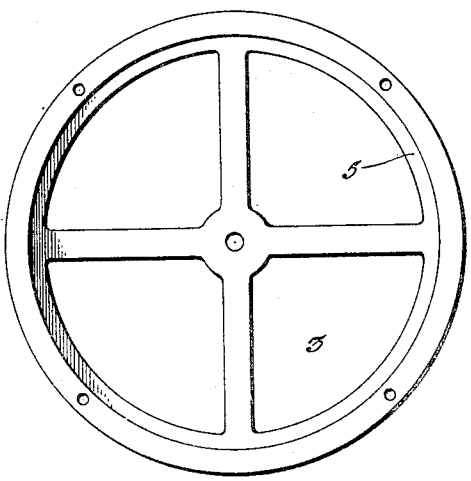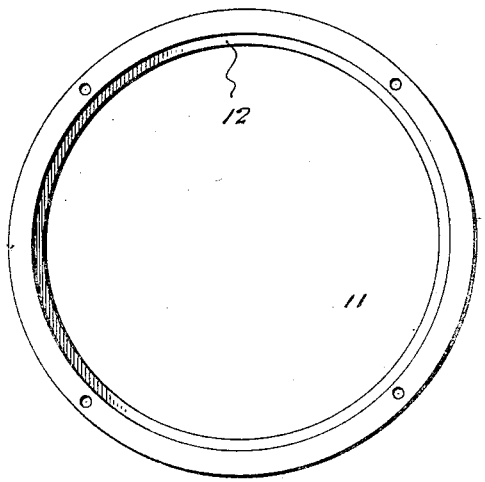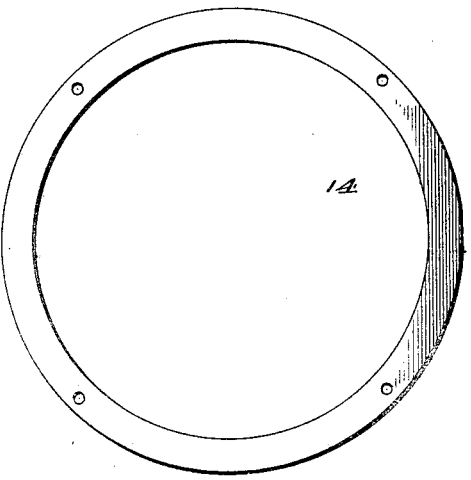

Patented Aug. 26, 1924.

1,506,689

UNITED STATES PATENT OFFICE.

HARRY A. TALLANT, OF ST. PAUL, MINNESOTA.

PLUMB LEVEL.

Application filed December 31, 1921. Serial No. 526,203.

*To all whom it may concern:*

Be it known that I, HARRY A. TALLANT, a citizen of the United States, residing at St. Paul, in the county of Ramsey and State of Minnesota, have invented new and useful Improvements in Plumb Levels, of which the following is a specification.

This invention relates to a combination level, plumb and grade finder, the general object of the invention being to provide a device of this nature which is provided with a dial having both inches and degrees thereon and a double pointer associated therewith so that an elevation, for instance, can be found in both degrees and inches at the same time, and a plumb weight for actuating the pointer.

Another object of the invention is to provide a mirror which is so arranged in relation to the dial and pointer that an accurate reading is secured.

A still further object of the invention is to provide means for preventing movement of the plumb weight when the device is not being used.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a face view of the device.

Figure 2 is an edge view thereof.

Figure 3 is a central cross sectional view.

Figure 4 is a face view of the spider member.

Figure 5 is a face view of the outer ring member.

Figure 6 is a view of the washer member.

Figure 7 is a view of the mirror.

Figure 8 is a sectional detail view of the locking means of the weight.

In these views 1 indicates the stock which is provided with a recess 2 to receive the parts of the device. The spider member 3 is held in the bottom of this recess by the screws 4 which pass through the rear of the stock. This spider member is provided with an annular recess 5 upon its outer part for receiving the periphery of a circular mirror 6. A ring 7 is seated on the spider member and overlaps the mirror, this ring having a dial 8 on its overlapping part. One half of the stock carries the indications 9, representing inches, and the other half the indications 10, representing degrees, so that the pointer will indicate inches and degrees at the same time. A ring member 11 is seated upon the dial and this ring member has an annular recess 12 therein for receiving the periphery of a transparent member 13 which is held in place by a washer 14 of ring shape. Bolts 15 pass through this washer, the ring member, the dial and engage screw threaded openings in the spider member. Thus all the parts are bolted together and the spider member, to which all the other parts are connected, is bolted to the stock. A jewel bearing 16 is carried by the hub of the spider member and a similar bearing is carried by a set screw 18 which is supported on the transparent member 13 by the flanged nuts 19. The pointed ends of a shaft 20 engage these bearings, said shaft passing through a hole in the mirror. A weight 21 is connected with the shaft, said weight being located between the mirror and spider member and a double pointer 22 is connected with the outer end of the shaft and is arranged in the space between the mirror and transparent member. This pointer cooperates with the dial. A ring 23 of cement or the like is placed around the periphery of the device after it is placed in the recess in the stock, this cement covering the ring member in the heads of the bolt and overlapping the transparent member.

In order to prevent movement of the weight 21 when the device is not being used I provide a bolt 24 which passes through a screw threaded hole in the stock and has its rounded end adapted to engage a socket 25 in the weight.

From the above it will be seen that the plumb weight will move the double pointer to indicate the amount a piece of work is out of plumb, the amount being readable in both inches and degrees. The device can also be used to find elevations and in fact can be used for all purposes that a level or plumb can be used. By using jewel bearings a very sensitive and active movement of the shaft is secured and this movement can be adjusted by means of the adjusting screw. The locking device can be used to prevent movement of the parts when the device is not being used. The mirror will permit accurate reading to be made as a person can tell instantly if they are in direct line with the marking on the dial and the indicator.

This device may be used as a transit and it may be used as a grade finder on a car, the grades being read as the car moves along the track.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the character described comprising a casing open at one side, a spider arranged in the casing at its closed end, an annulus superimposed on the spider, a transparent disk held in the annulus, retaining elements passing through the annulus and spider, a stub shaft having one end journaled in the spider and its opposite end journaled in the transparent disk, indicating elements at one end of the shaft and a weighted arm fixed to the opposite end of said shaft.

2. In combination with a casing open at one side, a transparent member held in the opposite side, a stub shaft journaled between the casing and transparent element, an indicating hand fixed to one end of the shaft, an arm depending from the opposite end of the shaft, a weighted head on the lower end thereof having a concaved recess, an adjustable screw carried by the casing and having its end mounted to be received in the concaved recess to lock the arm against movement.

In testimony whereof I affix my signature.

HARRY A. TALLANT.